(12) United States Patent
Gaspar

(10) Patent No.: US 9,236,981 B2
(45) Date of Patent: Jan. 12, 2016

(54) GFDM RADIO TRANSMISSION USING A PSEUDO CIRCULAR PREAMBLE

(71) Applicant: Vodafone GmbH, Dusseldorf (DE)

(72) Inventor: Ivan Gaspar, Dresden (DE)

(73) Assignee: Vodafone GmbH, Düsseldorf (DE)

( * ) Notice: Subject to any disclaimer, the term of this patent is extended or adjusted under 35 U.S.C. 154(b) by 0 days.

(21) Appl. No.: 14/568,570

(22) Filed: Dec. 12, 2014

(65) Prior Publication Data

US 2015/0172010 A1 Jun. 18, 2015

(30) Foreign Application Priority Data

Dec. 12, 2013 (EP) .................................... 13196934

(51) Int. Cl.
| | | |
|---|---|---|
| H04L 27/00 | (2006.01) | |
| H04L 5/00 | (2006.01) | |
| H04L 27/26 | (2006.01) | |
| H04L 27/12 | (2006.01) | |
| H04L 27/14 | (2006.01) | |

(52) U.S. Cl.
CPC .............. *H04L 5/003* (2013.01); *H04L 5/0003* (2013.01); *H04L 27/122* (2013.01); *H04L 27/14* (2013.01); *H04L 27/2605* (2013.01); *H04L 27/2613* (2013.01); *H04L 27/2662* (2013.01); *H04L 27/2678* (2013.01)

(58) Field of Classification Search
CPC ..... H04L 5/003; H04L 27/122; H04L 5/0003; H04L 27/14
USPC ......................................................... 375/295
See application file for complete search history.

(56) References Cited

U.S. PATENT DOCUMENTS

| | | | |
|---|---|---|---|
| 2005/0276339 A1* | 12/2005 | Chow et al. .................... | 375/260 |
| 2010/0290449 A1* | 11/2010 | van Nee et al. ................ | 370/338 |
| 2013/0163542 A1* | 6/2013 | Fettweis et al. ................ | 370/329 |
| 2015/0071242 A1* | 3/2015 | Vilaipornsawai et al. .... | 370/330 |

FOREIGN PATENT DOCUMENTS

| | | |
|---|---|---|
| EP | 1 976 208 | 10/2008 |
| EP | 2 099 187 | 9/2009 |

OTHER PUBLICATIONS

European Search Report for EP 13196934.7 dated Jun. 23, 2014.
(Continued)

*Primary Examiner* — Juan A Torres
(74) *Attorney, Agent, or Firm* — Workman Nydegger

(57) ABSTRACT

A radio transmission system based on a frequency divisional multiplexing method is described, comprising an improved method for estimating symbol timing offset and frequency timing offset. The receiver estimates the symbol timing offset based of a block of received symbols based on a cyclic prefix and suffix.

16 Claims, 5 Drawing Sheets

(56) References Cited

OTHER PUBLICATIONS

Hewei Yu Ed—"A Novel Timing Estimation Method Based on Symmetrical & Conjugate Prefix in OFDM System", Wireless Communications, Networking and Mobile Computing, 2006. WICOM 2006. International Conference on, IEEE, PI, Sep. 1, 2006, pp. 1-4, XP031074247, ISBN: 978-1-4244-0517-6.

Huawei: "Cell-specific signals for 1-16 initial synchronization and cell identification", 3GPP Draft; R1-060225, 3rd Generation Partnership Project (3GPP), Mobile Competence Centre ; 650, Route des Lucioles ; F-06921 Sophia-Antipolis Cedex ; France, vol. RAN WG1, No. Helsinki, Finland; 20060123, Jan. 18, 2006, XP050417389, [retrieved on Jan. 18, 2006] paragraph [0001]—paragraph [0003].

* cited by examiner

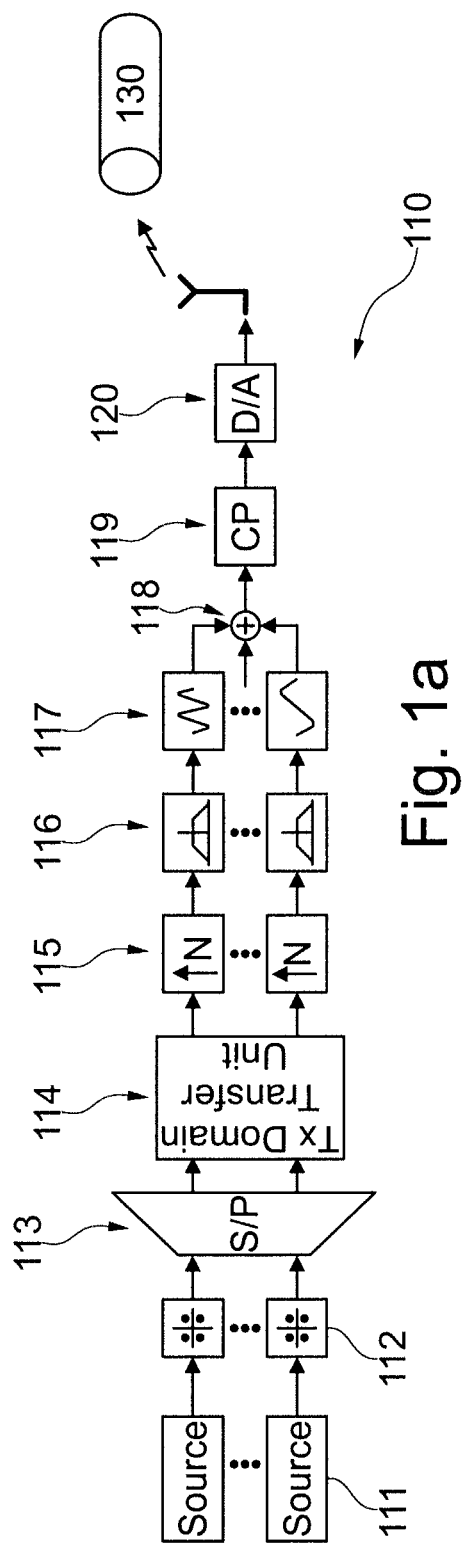
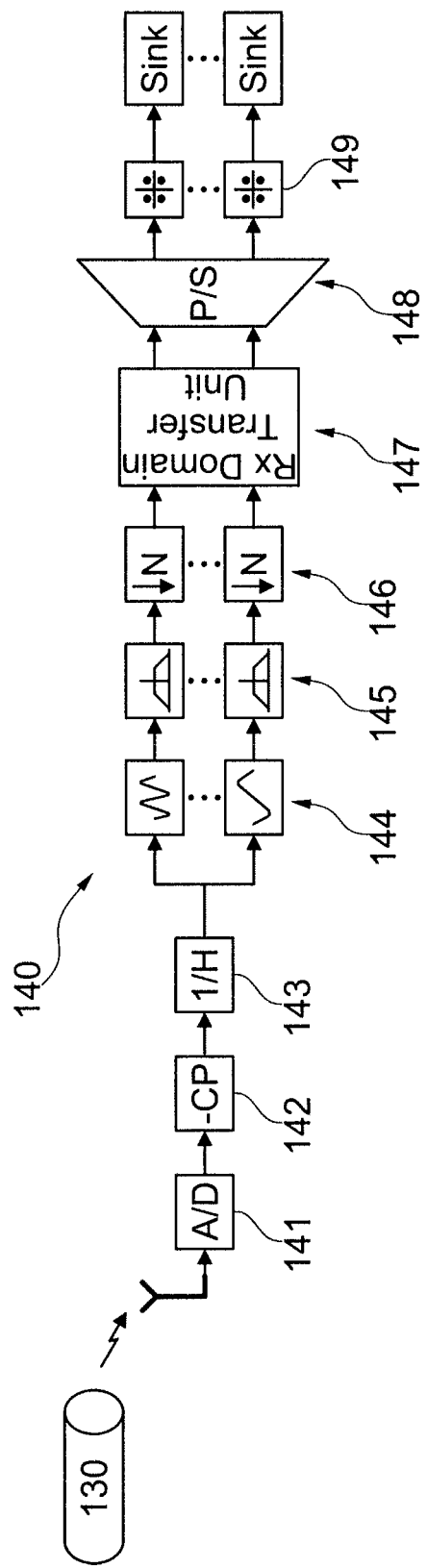
Fig. 1a
Fig. 1b

GFDM RADIO TRANSMISSION USING A PSEUDO CIRCULAR PREAMBLE

CROSS-REFERENCE TO RELATED APPLICATIONS

This application claims priority to European Application Number 13196934.7, filed on Dec. 12, 2013, the entirety of which are incorporated herein by reference.

BACKGROUND

1. The Field of the Invention

The invention relates to a radio transmission system using the generalized frequency divisional multiplexing (GFDM) method.

2. The Relevant Technology

The so-called generalized GFDM system is a recent physical layer (PHY) scheme proposed to address the challenges for 5th generation cellular systems with opportunistic use of frequency spectrum and relaxed synchronization. The GFDM system provides a fast, flexible scalable and content aware physical layer scheme which at the same time is robust and reliable, while using vacant frequency bands, e.g. so-called TV white spaces. The basic GFDM system has been described in "GFDM Generalized Frequency Division Multiplexing" by Fettweis et al., IEEE VTC spring 2009.

Though the GFDM system shares some properties with well-known OFDM systems, there are significant differences. While both systems may divide an available frequency band into at least two adjoining sub-bands, the GFDM system may deploy transmission parameters individual for each of the at least two sub-bands while in OFDM the transmission parameters deployed in the sub-bands are similar or identical, i.e. uniform. Furthermore, in the OFDM system each block of symbols exhibits a unique preamble, while the GFDM system uses a common preamble for a block of symbols allocated in the at least two sub-bands.

With regard to synchronization, synchronization methods are well known and established in the various OFDM systems, while there is no synchronization procedure developed yet for GFDM which supports the efficiency of the GFDM system while exploiting the particular properties of the GFDM system. Thus the invention is directed towards improving the GFDM system.

BRIEF SUMMARY

The invention relates to a radio transmission system using the generalized frequency divisional multiplexing (GFDM) method. In particular the invention relates to a pseudo circular preamble used in a GFDM system comprising a special data sequence either in a cyclic prefix (CP) and cyclic suffix (CS) in a single burst transmission to produce a pseudo circular preamble or in a suffix appended to each transmit block of a framed structure transmission, wherein said special data enables estimating the detection of a GFDM signal, particularly the symbol time arrival, i.e. the symbol timing offset (STO) and the carrier frequency offset (CFO).

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 1a and 1b schematically depicts the forming of GFDM symbols;

DETAILED DESCRIPTION

Figure 2:
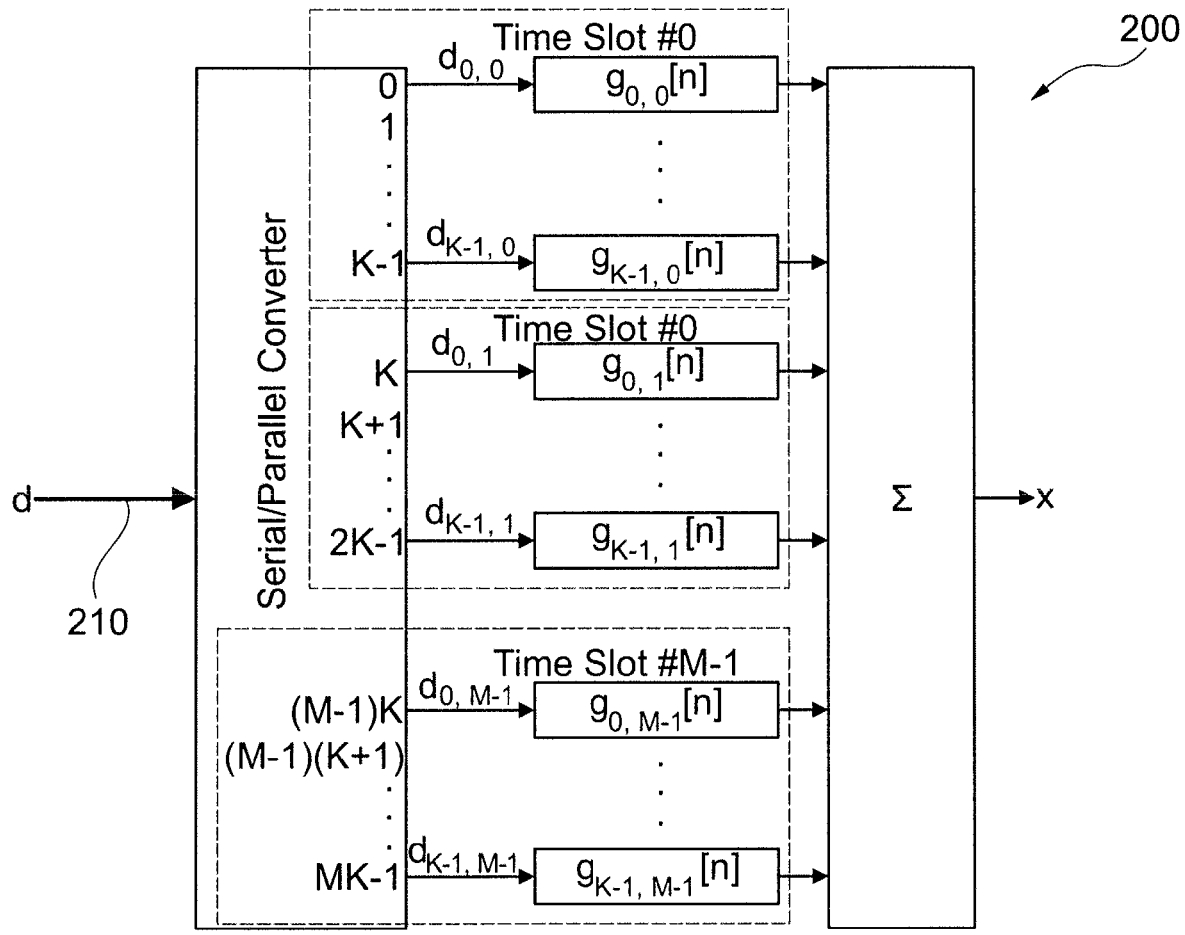
FIG. 2 depicts a schematic of a serial-to-parallel converter.

The generalized frequency divisional multiplexing system defines a system architecture allowing opportunistically exploiting vacant frequency bands, for example TV white spaces, for wireless data communications. The system defines a concept for a physical layer and transmitters and receivers adapted and configured for using said physical layer concept as described below. Due to the opportunistic use of vacant frequency bands, i.e. bands that are not allocated for the GFDM system but currently are vacant, the signal generation in the GFDM system should ensure ultra-low out of band radiation to strictly avoid harmful interference to signals in adjoining frequency bands. Furthermore the receivers should exhibit high sensitivity in order to explore vacant frequency bands, i.e. to sense even very weak radio signals in the frequency bands that are candidates for use.

Vacant frequency bands for use may be detected by any arbitrary method or device. In one embodiment the transmitter and/or the receiver of the GFDM system may cooperatively detect vacant frequency ranges by scanning frequencies for radio signals. In that case the scanned frequency obviously is in use and consequently cannot be used by GFDM system. If at least one of the transmitter and the receiver detects a vacant frequency band, the detecting station may inform its communication partner via another established communication link about said detected vacant frequency band. The partner station may then sense that band in order to ensure that there is no signal detectable. If both communication partner stations consider the frequency band as vacant said band may be used subsequently by the communication partners. In this way transmitter and receiver may try to detect and agree on using vacant frequency bands in addition to the established communication link.

The described GFDM system may use a plurality of frequency bands; typically the GFDM system deploys at least two frequency bands. The carrier frequencies may have different bandwidths. In each of the two frequency bands a respective carrier frequency is individually modulated, i.e. the applied modulation scheme may vary from frequency band to frequency band, wherein some form of QAM modulation may be used.

Each carrier is divided into time slots of equal duration, i.e. within each frequency band time slots of equal duration are defined. However, time slots of different frequency bands may differ in duration, i.e. symbol duration used for transmission in a first frequency band may differ from symbol duration used in a second frequency band. Consequently the number of time slots may vary from frequency band to frequency band. In frequency bands of larger bandwidth a higher number of time slots, i.e. shorter in duration, can be used within a transmit block than in frequency bands of smaller bandwidth. As a consequence a higher number of time slots are possible and used in a frequency band of larger bandwidth while achieving the same block size when combining said frequency band with a band of smaller bandwidth.

FIGS. 1a, 1b depict a schematic of a generalized frequency division multiplexing (GFDM), system comprising a transmitter 110 and a corresponding receiver portion 140 coupled by a channel 130, wherein FIG. 1a depicts a schematic of a transmitter and FIG. 1b depicts a schematic of a receiver. The system schematically depicts a GFDM transmission system adapted and configured for implementing the invention, wherein figures provide an overview of the processing.

The processing blocks of transmitter 110 may be all digital except for a digital-to-analog converter that converts the transmit signal from a digital representation to an analog signal prior to transmitting the signal by a transmit antenna and except for processing blocks arranged in the chain of processing blocks behind that converter. Similarly receiver portion 140 may comprise digital processing blocks only except for an analog-to-digital converter at the radio front end of the receiver and processing blocks arranged in the processing chain before said analog-to-digital converter such as a low-noise amplifier.

In one embodiment one or a plurality of data sources 111 may output streams of binary data. Each data stream may have an individual data rate. Data bits of streams 111 are mapped to symbols in mappers 112 thus producing streams of symbols. Each mapper 112 may map bits of an inbound stream 111 to symbols using an appropriate constellation, i.e. selected according to the expected channel conditions and data rate and further conditions, thus producing a stream of symbols. Note that data streams 111 may originate from a single user or a plurality of users.

In an alternative embodiment the plurality of mappers may be replaced by a single mapper, which may map one or more incoming data streams 111 to symbols.

The symbols as output by mappers 112 are assigned to a plurality of transmit resources, i.e. carriers. In one embodiment this can be achieved by a demultiplexer or serial-to-parallel converter 113 thus producing a plurality of at least two parallel symbol sequences, the parallel symbol sequences thus comprising portions of the symbol sequences output from mappers 112.

The symbols as output from serial-to-parallel converter 113 form a block of data symbols, wherein a sequence, i.e. a finite number, of symbols assigned to one carrier may form one column of that matrix. Symbols of one row accordingly are assigned to the same time slot but different carriers. Said matrix accordingly may be defined in the time-frequency domain, where the first domain index derives from the rows and the second from the columns.

Note that in one embodiment the symbol matrix may be transformed by block 114 from the frequency-time domain either to the frequency-frequency domain or the time-time or the time-frequency domain by applying corresponding transformations to the matrix, i.e. an FFT or an IFFT.

For illustration purposes only the described transmitter may comprise a plurality of parallel processing paths to illustrate the blockwise processing of symbols as described in the following. Note that said processing can be performed using digital values representing the symbols etc., so that the actual processing may be performed using digital signal processing devices, i.e. the digital processing may be implemented using one or more digital processors and a suitable set of instructions, e.g. executable software.

Each of the plurality of parallel processing paths comprises a chain of processing blocks of similar functionality, so the description provided below for one processing path applies to each. However the processing in the paths differs in at least one processing block, i.e. typically the last processing block in a path, which converts the symbols of a sub-sequence to an individual transmit frequency.

In each processing path the symbols are up-sampled in a corresponding processing block 115, thus producing a sequence of up-sampled symbols in each processing path. The processing steps of up-sampling the symbols of each sequence can be performed as a matrix multiplication.

Subsequently a transmit filter 116, also known as pulse shaping filter, can be applied to the up-sampled symbols in each processing path, which allows to individually shape the symbols assigned to a carrier, thus producing a sequence of filtered symbols in each path. Note that the pulse shaping filters 116 applied to the parallel sequences of symbols may differ from each other.

In one embodiment the pulses of the symbols are shaped by a raised-cosine pulse shaping filter and a smoothing function. In one embodiment the raised-cosine pulse shaping filter for the raising edge of a pulse may be $v'=\frac{1}{2}-\frac{1}{2}\cos(\pi v(t))$ and for falling edge of a pulse correspondingly $v'=\frac{1}{2}+\frac{1}{2}\cos(\pi v(t))$, wherein v(t) represents samples of the symbols smoothed by a smoothing filter according to the function:

$$v(t)=t^4(35-84t+70t^2-20t^3) \text{ with } t\epsilon(0,1).$$

According the samples of a pulse are smoothed by the smoothing function and then shaped by the raised-cosine pulse shaping filter, thus shaping the raised cosine roll-off function from inside.

Note that in an alternative embodiment samples $v(t)=t$ with $t\epsilon(0,1)$ can be used as argument for the roll-off raised-cosine pulse shaping filter instead of the smoothed samples.

In this way the roll-off pulse shaping and the smoothing filter can be applied to pulses to shape these in time and/or in frequency thus applying a smooth roll-off in time and/or frequency to the pulses. These shaped and smoothed pulses exhibit a particular low out-of-band radiation.

The filtered symbols of each of the parallel symbol sequences are then upconverted in frequency, i.e. converted to their respective carrier frequency using converter devices 117, thus producing sequences of up-converted transmit symbols. The upconverted symbols of each time slot then are combined, i.e., summed up in block 118. Processing block 118 may be an adder that sums up the upconverted symbols.

A block of symbols in this way comprises at least two different carrier frequencies, wherein at least one carrier frequency carries two payload symbols consecutive in time.

A cyclic prefix is then added to each sum of upconverted symbols in processing block 119. This is done by prepending in front of each symbol a number of samples that are taken from end of that symbol. The signal is passed to a digital-to-analog converter 120 to produce an analog transmit signal that is then upconverted to radio frequency, amplified and finally transmitted by an antenna.

Channel 130 transports the analog transmit signal to the antenna of receiver 140, which processes the received radio signal to identify the digital data transmitted, wherein the processing within receiver 140 essentially reverses the processing of transmitter 110.

Note that in the described example the channel is depicted as a wireless channel. However, the invention is not limited in this regard, since the idea relates to processing transmit symbols resulting in a vector of transmit symbols, wherein said vector of symbols can be transmitted as a radio, acoustic, optical, etc. wave or as a signal on a wire. Accordingly channel 130 in one embodiment may be a wireless or a wired channel.

In an early processing step a low-noise amplifier (LNA) comprised in receiver 140 may amplify the received analog signal, a mixer may convert the signal to baseband. Analog-to-digital converter ADC 141 may convert the receive signal from analog to digital thus producing an amplified digital signal representing the analog receive signal in baseband. Note that for ease of understanding this model uses a baseband representation of the signal, whereas a practical implementation may alternatively process the signal at an intermediate frequency, thus comprising conventional frequency shifting processing. In the remainder said digital representation of the received signal is called receive signal. Note that said LNA is not depicted in FIG. 1*b*.

Note that, as mentioned above for the transmitter, the digital processing of the receive signal can be implemented using at least one digital signal processor using a suitable instruction set, e.g. software, wherein processing blocks may be implemented as portions of the software.

Processing block 142 removes the cyclic prefix from the receive signal and processing block 143 equalizes the receive signal. Note that in an alternative embodiment the equalizer may be implemented in each processing path, i.e. branch, individually and may accordingly equalize the signal of a processing path individually. The equalized receive signal is then coupled to a plurality of parallel processing paths. In each of the processing paths the equalized receive signal is down-converted using down-converter processing blocks 144 to produce a plurality of down-converted receive signals, wherein the down-converter processing blocks output receive signals down-converted to the carrier frequencies corresponding to the carrier frequencies used in the transmitter, thus producing a plurality of down-converted copies of the receive signal in each of the parallel processing paths. The down-converted portions of the receive signal then are forwarded to a receive filter 145 to produce filtered copies of the receive signal. In one embodiment receive filter 145 may be a tail biting receive filter corresponding to the tail biting transmit filter comprised in the transmitter.

The filtered copies of the receive signal in each branch of the receiver are down-sampled in block 146 and forwarded to receive domain transfer unit 147. The domain transfer unit may transform the down-converted copies of the receive signal, which form a matrix defined in time-time domain, into the frequency-time domain or the time-frequency domain or the frequency-frequency domain, which can be achieved by applying a matrix operation.

The matrix of symbols then is passed to a parallel-to-serial converter 148, which may output one or more symbol sequences comprising the symbols as processed in the plurality of parallel processing paths or processing branches.

Each symbol sequence is passed to a detection block 149 for detecting the symbols transmitted via the plurality of carriers and for de-mapping the symbols. Detection blocks 149 accordingly output outbound streams of binary data, which ideally match the inbound streams of binary data 111 and which are forwarded to data sinks.

Note that the invention is part of a communications system, that can arbitrarily be extended, e.g. by channel encoding, i.e. introducing any redundancy into the transmitted information for error detection and correction, has not been described in the context of this invention. However, conventional channel encoding can be easily introduced into the described system model for example by including a corresponding encoder arranged before the mapper in the transmitter and by including a corresponding decoder after the de-mapper in the receiver portion.

FIG. 2 depicts a schematic of a serial-to-parallel converter 113 that generates a generates a block of symbols, i.e. a matrix of symbols. As described above with reference to FIG. 1 the processing of symbols can be illustrated by a system comprising a plurality of parallel processing paths. However, the entire processing actually is performed digitally and in software, wherein the block of symbols is a matrix of digital representations of symbols.

Accordingly, the serial-to-parallel converter 200, i.e. corresponding to block 113 in FIG. 1, receives at least one or a plurality of streams 210 of symbols d as input, performs a matrix operation A on said symbols and outputs a block of samples x. The operation performed by the serial-to-parallel converter thus can be expressed as:

$$x = Ad$$

wherein A is the matrix containing all impulse responses of the system, i.e. said matrix performs the filtering and pulse shaping of the system.

Considering that the symbols are mapped to a plurality of K subcarriers, i.e. $k=0, 1, \ldots K-1$ is the subcarrier index, one block of symbols as output by converter 200 consists of M symbols, i.e. $m=0, 1, \ldots M-1$ is the time slot index of the symbol input stream, then a plurality of MK input signals $d_{k,m}$ is transmitted. Said plurality of input symbols can be written in matrix form as:

$$d = [d_{0,0} d_{0,1} \ldots d_{K-1,0} d_{0,1} \ldots d_{K-1,1} \ldots d_{0,M-1} \ldots d_{K-1,M-1}]^T$$

The impulse response, i.e. a filter for a single sample, i.e. the n-th sample, of an input symbol is:

$$g_{k,m}[n] = g[(n - mN) \bmod MN] e^{-i2\pi \frac{k}{N} n}$$

wherein $$\sum_{n=0}^{MN-1} |g[n]|^2 = 1$$

An impulse response for a symbol, i.e. a filter $g_{k,m}$ for the samples of the m-th time slot in the k-th subcarrier, is:

$$g_{k,m} = [g_{k,m}[0] g_{k,m}[1] \ldots g_{k,m}[MN-1]]^T$$

Matrix A, i.e. the matrix comprising all impulse responses of the system corresponding to all filters $g_{k,m}$ is:

$$A = [g_{0,0} g_{1,0} \ldots g_{K-1,0} g_{0,1} \ldots g_{K-1,1} \ldots g_{0,M-1} \ldots g_{K-1,M-1}]$$

The n-th sample of filtered symbol x, i.e. x[n] can be calculated according to:

$$x[n] = \sum_{m=0}^{M-1} \sum_{k=0}^{K-1} d_{k,m} g_{k,m}[n]$$

The vector x, wherein one symbol x is represented by its N samples $x[0] \ldots x[n] \ldots x[N-1]$, and wherein $n=0 \ldots N-1$ is the index of the samples, accordingly is:

$$x = [x[0] \ldots x[n] \ldots x[MN-1]]^T.$$

Filter matrix A is extended by adding sub-matrices as described in more detail below, a block of symbols x can be extended. By applying extended matrix $A_E$ to symbols d, an extended block of transmit symbols is generated.

Figure 3A:
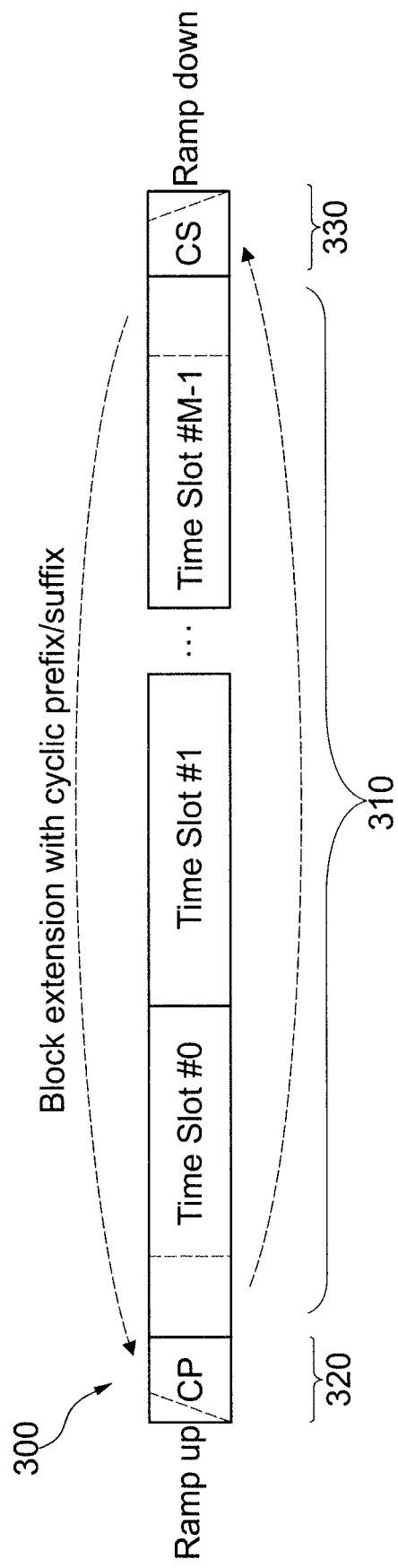
FIG. 3a schematically illustrates the extension of a transmit block by adding a prefix and a suffix.

FIG. 3a illustrates the extension of a single transmit block by adding a prefix and a suffix to the block. The extended block 300 of transmit symbols comprises a plurality of filtered payload symbols, i.e. at least two transmit payload symbols, arranged and transmitted in at least consecutive two time slots 310. Note that in FIG. 3a the number of time slots per subcarrier is assumed as identical. In FIG. 3 the time slots 310 are numbered #0 . . . #M−1 corresponding to afore used notation. Furthermore block 300 comprises a cyclic prefix 320 CP of length $L_p$ and a cyclic suffix 330 CS of length $L_s$.

The extended block of transmit symbols $x_E$ can be generated by applying an extended filter matrix $A_E$ to input symbols d. The extended block of transmit symbols $x_E$ thus can be calculated:

$$x_E = A_E d$$

wherein the extended matrix $A_E$ can be calculated by applying an extension matrix E to matrix A:

$$A_E = EA$$

Extension matrix E consists of an identity sub-matrix I of size MN, a zero sub-matrix Z, a prefix sub-matrix P of size $L_p$ and a suffix sub-matrix S of size $L_s$. Extension matrix E can be written as:

$$E = \begin{bmatrix} Z_{L_p, MN-L_p-1} \mid P_{L_p} \\ I_{MN} \\ S_{L_s} \mid Z_{L_s, MN-L_s-1} \end{bmatrix}$$

wherein identity matrix I is of size MN to leave all payload symbols without amendment. Sub-matrix Z is of size $L_s$, MN−$L_s$−1 and is a matrix consisting of zeros only.

Prefix sub-matrix P is a filter that generates and shapes the samples of prefix 320 CP based on the samples of the payload symbols and that are added to the samples of the payload symbols 310. The samples of prefix sub-matrix P thus generate and add the cyclic prefix CP to the samples of the payload symbols. Prefix shape matrix P can be written as:

$$P = \begin{bmatrix} p[0] & 0 & \cdots & 0 \\ 0 & p[1] & & \vdots \\ \vdots & & \ddots & 0 \\ 0 & \cdots & 0 & p[L_p-1] \end{bmatrix}$$

Similarly sub-matrix S is a filter matrix that generates the samples of suffix 330 CS based on the payload symbols and concatenates these samples to the end of the payload symbol samples. Suffix shape matrix S can be written as $$S = \begin{bmatrix} s[0] & 0 & \cdots & 0 \\ 0 & s[1] & & \vdots \\ \vdots & & \ddots & 0 \\ 0 & \cdots & 0 & s[L_s-1] \end{bmatrix}$$

The objective of synchronizing the receiver to a received signal is to precisely remove the cyclic prefix CP and cyclic suffix CS from the received signal in order to allow further operation of channel equalization and symbol detection. To enable the receiver to exactly remove the cyclic prefix of a received block of symbols, the receiver must be enabled to detect the first sample of a block of symbols as exactly as possible.

A cross-correlation of the cyclic prefix and cyclic suffix added to a block of symbols exhibits an impulsive signal, when one of them is reversed in time and in case of an exact match. In other words the signal indicating the exact match of the prefix and suffix is indicated by a Dirac pulse when cross-correlating the prefix and suffix, when one is reversed to the other.

At the receiver, the detection circuitry, i.e. a synchronization stage as described below, performs a cross-correlation operation of the cyclic prefix and the cyclic suffix of a received block of symbols, wherein either the prefix or the suffix is reversed. Said correlation operation of the prefix and suffix results in an impulsive signal if the exact prefix and the reversed exact suffix are correlated, wherein the term exact prefix shall mean that it consists of all samples constituting the prefix and only of samples constituting the prefix. Similarly the term exact suffix shall mean that it consists of all samples constituting the suffix and only of samples constituting the suffix.

Consequently, only if the exact prefix and the reversed exact suffix are cross-correlated, the impulsive signal, i.e. a Dirac pulse, can be detected. In other words, if the cross-correlation of the prefix and reversed suffix results in an impulsive signal, then this indicates that exactly all samples of the prefix and suffix have been identified. This method step thus allows identification of the exact prefix and suffix and in this way allows precise determination of the symbol timing offset.

As a consequence the cyclic prefix and the cyclic suffix can be removed exactly from the received block of symbols, thus allowing the exact identification of the payload symbols, i.e. all samples of the payload symbols and only the samples of the payload symbols.

In an alternative embodiment the cross-correlation operation can be performed based on the reversed cyclic prefix and the cyclic suffix, i.e. the non-reversed cyclic suffix, wherein the suffix and prefix similarly show an impulsive signal when cross-correlated.

Note that by deploying a prefix and suffix combination exhibiting said impulsive signal when cross-correlating, one of these being reversed, the detection of the exact prefix and suffix can be accelerated and is more precise than a method based on a conventional sliding window operating of prefix and suffix exhibiting a pyramidal metric upon cross-correlation. In particular the position of exact correlation can be identified more clearly than in a pyramidal method, since with a pyramidal sliding window the correlation drops slowly thus making it more prone to noise effects.

In one embodiment the prefix and suffix can be a constant amplitude zero autocorrelation sequence, i.e. CAZAC sequence, in time domain with symmetric and conjugated response. In an alternative embodiment Zadoff-Chu sequences in time and frequency domain are suitable as prefix and suffix. These sequences produce symmetric and conjugated responses in time domain and frequency domain. In a third alternative embodiment real random sequences defined in the frequency domain may be used, which produce a symmetric and conjugated response in the time domain.

In addition to the above described property of a pulse-like signal produced when cross-correlating prefix and suffix, one reversed to the other, the prefix may optionally undergo a ramp up shaping and the suffix may undergo a ramp down signal shaping to provide for smooth symbol transitions.

In one embodiment, particularly for transmitting a single block of symbols, a transmit block may comprise symbols of a least two carrier frequencies, wherein at least one of the carrier frequencies carries two symbols, may further comprise a prefix and a suffix, wherein a cross-correlation of the prefix and suffix, one of the reversed to the other, shows an impulsive signal. The prefix and suffix enable a receiver to exactly identify the prefix and suffix, i.e. the samples forming prefix and suffix respectively. As a consequence the receiver is enabled to identify the symbol timing offset (STO) very precisely and to remove the prefix and suffix precisely.

Once the symbol timing offset (STO) has been identified and the received signal is transferred into the frequency domain, the prefix and suffix can be used to remove the symbol frequency offset (SFO). For fractional values of a symbol frequency offset a conventional auto-correlation can be performed with the cyclic prefix and its counterpart, i.e. the cyclic suffix, wherein the samples are not reversed. If the detected peak of this operation is not solely a real value, then there is a phase rotation between the cyclic prefix and cyclic suffix thus indicating a frequency offset. Accordingly the value of the angle of the peak sample can be used to estimate a fractional frequency offset. In one embodiment the frequency offset can be removed by multiplying the samples of the block of received symbols with a complex exponential function that shifts back the bandwidth to the exact base band position. If a frequency offset higher than a subcarrier is to be considered than additional processing in the frequency domain would allow its compensation. In frequency domain the Zadoff-Chu sequence for example contains the same properties of symmetric conjugate samples, so similar operation of cross-correlation can be employed. Similarly if real PN sequence is used in frequency domain as the training sequence the exactly integer frequency offset can be achieved by cross correlation.

Figure 3B:
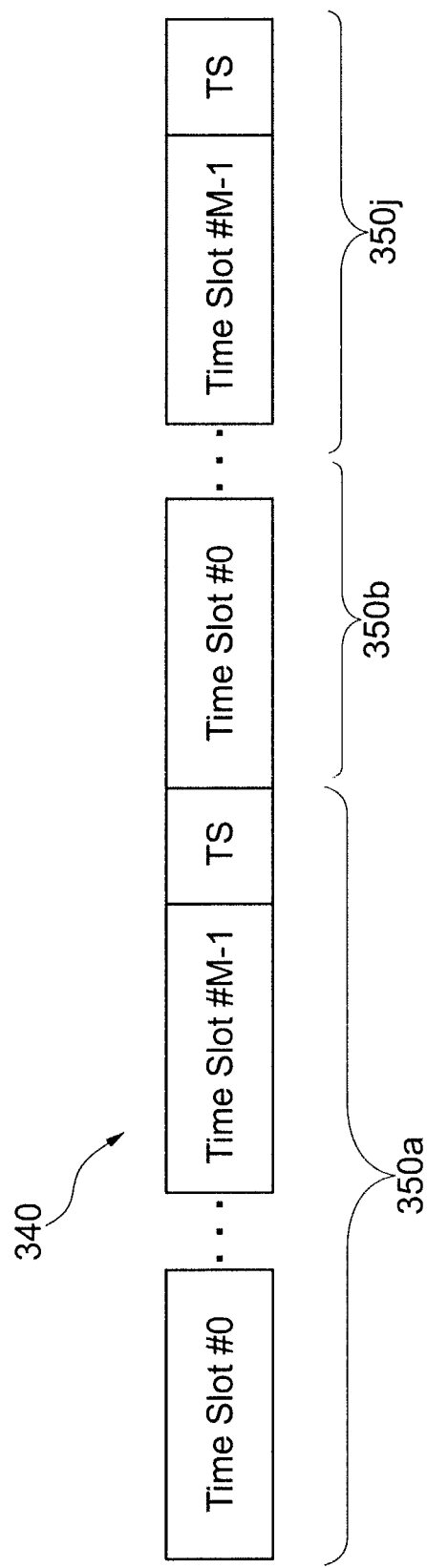
FIG. 3b schematically illustrates the extension of transmit blocks by adding a suffix to each transmit block in a framed transmission.

FIG. 3b depicts an alternative embodiment 340 of a framed transmission. In this embodiment a plurality of transmit blocks 340 being consecutive in time, i.e. in a framed arrangement, are transmitted in a continuous transmission.

Further note that FIG. 3b depicts time slots of equal duration. However, as noted above, time slots in different subcarriers may be of different duration, wherein the duration of consecutive transmit blocks is assumed to be identical for all transmit blocks.

Each transmit block 350a . . . 350j comprises payload symbols mapped to time slots #0 to #M−1 and a suffix conveying a special training sequence TS. Accordingly said special training sequence is appended to each transmit block of payload symbols. In the framed transmission structure, the first payload symbol of a current transmit block 350b seamlessly concatenates to the special training sequence TS, i.e. the suffix of the previous transmit block 350a.

Consequently a suffix is appended to the payload symbols of each transmit block, but no prefix is prepended to the payload symbols. However, since the transmit blocks are transmitted as a continuous stream, i.e. the transmit blocks are abutting, the suffix of a previous transmit block serves as a prefix for a current transmit block. A receiver may accordingly identify the suffixes appended to the payload symbols of a transmit block by receiving and correlating suffixes of two consecutive transmit blocks as described above, wherein one of the suffixes must be reversed to the other. Note that the suffixes, as described above for the transmission of a single transmit block, may be one of a CAZAC sequence of a Zadoff-Chu sequence or a real random sequence.

Figure 4:
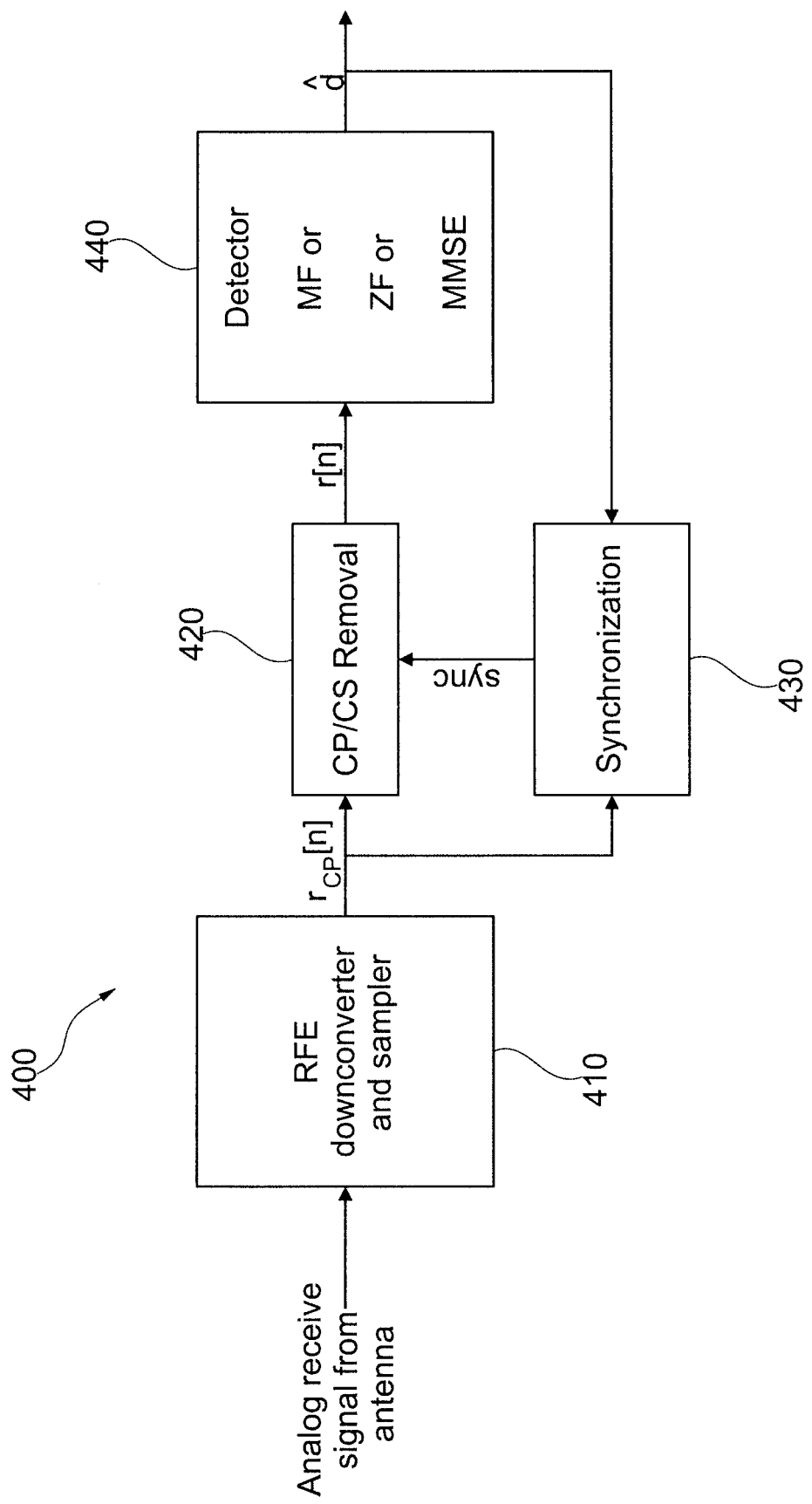
FIG. 4 illustrates the basic operation of a synchronization stage at a receiver.

FIG. 4 illustrates the basic operation of a synchronization stage 400 for synchronizing a received signal and for removing the cyclic prefix and cyclic suffix of a received signal, wherein the received signal is the transmission of a single transmit block comprising a prefix and a suffix, i.e. a non-continuous transmission.

At the receiver said receive signal initially is received as an analog signal by a receive antenna that forwards the analog receive signal to a radio front end processing block 410. Block 410 optionally may comprise a low-noise amplifier, i.e. LNA, and a means for down-converting and digitizing the received analog signal. In one embodiment said means for down-converting can be conventional mixer. The means for digitizing the received signal can be a conventional sampler that samples the received analog input signal and outputs digital samples representing the down-converted receive signal $r_{cp}[n]$, wherein the index cp shall indicate that this representation comprises the cyclic prefix and suffix.

Digital receive signal $r_{cp}[n]$ is passed to CP/CS removal block 420 and in parallel, i.e. at the same time, to synchronization block 430. Synchronization block 430 is communicatively coupled to CP/CS removal block 420 to provide a sync signal that indicates the beginning of a block of received symbols. It is assumed that the receiver has knowledge about the number of samples forming the cyclic prefix 320 and the number of samples forming the cyclic suffix 330, i.e. the sample clock is assumed to be the same in the transmitter and receiver. Note that this assumption is reasonable when considering a clock precision in the order of parts per million (ppm), e.g. 10 ppm as provided by today's crystal based oscillators. Considering now a block length in the order of thousands of samples the variation still is in the order of cents of a sample. Hence, in burst scenarios, the sample error resulting from clock impreciseness is negligible. For continuous transmissions the use of a fractional re-sampler can allow a fine compensation.

Synchronization block 430 performs a cross-correlation operation of the prefix and suffix of the received block of symbols, wherein one of the prefix and suffix is reversed. In case block 430 is configured to cross-correlate the prefix and the reverse of the suffix, block 430 may produce a reverse version of the suffix and perform the cross-correlation as soon as the block of symbols has been received completely.

Since the prefix and suffix show an impulsive signal when cross-correlated, wherein one of them is reversed, said cross-correlation is stopped as soon as said impulse is detected. The samples of the cross-correlated pre- and suffix in this way have been exactly identified. Block 430 then signalizes the beginning of the prefix to CP/CS removal block 420.

CP/CS removal block 420 may delay the processing of the received block of samples until the sync signal is provided by synchronization block 430. Once CP/CS removal block 420 receives said sync signal, block 420 removes the samples corresponding to cyclic prefix CP 320 and corresponding to cyclic suffix 330 CS based on the sync information. Block 420 then outputs digital receive signal r[n], which under ideal circumstances does not comprise a digital sample originating from cyclic prefix 320 and/or cyclic suffix 330.

The samples of receive signal r[n] then are passed to detector block 440 for estimating receive symbols d̂, which are forward to a subsequent processing block, not shown in the figure, and in parallel to synchronization block 430.

Detector block 440 may perform symbol detection based on the samples r[n] as output by cyclic prefix/cyclic suffix removal block 420, wherein detector block 430 may use a conventional matched filter (MF) algorithm or alternatively a so-called zero-force (ZF) algorithm or alternatively a minimum mean squared error (MMSE) algorithm for estimating symbols.

Note that detector block 440 is communicatively coupled to synchronization block 430. The signal provided by the detector block to the synchronization block indicates the likeliness of the symbols detection process. This signal may serve as an additional proof of having detected the exact prefix and suffix. In case the signal indicates a high likeliness of having detected the correct payload symbols, the signal provided to synchronization block 430 approves the exact synchronization of the receive signal. Vice versa, i.e. if the symbols were detected with a low probability, i.e. the likeliness of having detected the correct symbols is low, then synchronization block may take this information into account and may provide an amended, i.e. revised version of the synchronization signal to CP/CS removal block 420. In this way the detection of the payload symbols based on the samples of the receive symbol may be performed in iterations thus increasing the likelihood of detecting correct payload symbols.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transmitting digital data using a frequency divisional multiplexing method comprising:
    mapping digital payload data to a block of payload symbols, the payload symbols being spread across at least two frequency bands and wherein at least two symbols being conveyed in at least one frequency band;
    providing a first block of training symbols spread across the at least two frequency bands;
    appending a suffix to the block of payload symbols, wherein a cross-correlation of the first block of training symbols and a reversed suffix or a cross correlation of the reversed first block of training symbols and the suffix exhibit a pulse like signal upon exact match; and
    transmitting the first block of training symbols, the block of payload symbols, and the suffix.

2. The method of claim 1, wherein the first block of training symbols is a prefix prepended to the block of payload symbols.

3. The method of claim 1, wherein a plurality of blocks of payload symbols and a corresponding plurality of suffixes are transmitted contiguously, and wherein the suffix appended to a current block of payload symbols forms the first block of training symbols of the following block of payload symbols.

4. The method of claim 1, wherein the prefix and the first block of training symbols is one of:
    a constant amplitude zero autocorrelation sequence (CAZAC) in the time domain with symmetric and conjugated response,
    a Zadoff-Chu sequence defined in the time domain or in the frequency domain with symmetric and conjugated response, and
    a real random sequence defined in the frequency domain.

5. The method of claim 1, further comprising:
    applying a smoothing function of $v(t)=t^4(35-84t+70t^2-20t^3)$ with $t \in (0,1)$ to the samples of symbols and a raised cosine roll-off filter $v'(t)=\frac{1}{2} \mp \frac{1}{2} \cos(\pi v(t))$ to the smoothed samples of the symbols in time and/or frequency.

6. A method for receiving digital data using frequency divisional multiplexing comprising:
    receiving a frequency divisional multiplex signal representing the digital data;
    sampling the signal to produce samples of a first block of training symbols, samples of a block of payload symbols, and samples of a suffix appended to the block of payload symbols, wherein the samples of the first block of training symbols, the samples of the payload symbols and the samples of the suffix are spread across at least two frequency bands and wherein at least two payload symbols are conveyed in at least one frequency band, wherein a cross-correlation of the first block of training symbols and a reversed suffix or a cross correlation of the reversed first block of training symbols and the suffix exhibit a pulse like signal upon exact match; and
    identifying the first block of training symbols and the suffix, comprising:
        reversing the samples of either the first block of training symbols or the suffix and cross-correlating the samples of the reversed first block of training symbols and the suffix or the samples of the first block of training symbols and the samples of the reversed suffix respectively.

7. The method of claim 6, wherein the first block of training symbols is a prefix prepended to the block of payload symbols.

8. The method of claim 6, wherein the first block of training symbols is the suffix appended to a previous block of received payload symbols.

9. The method of claim 6, wherein the prefix and the first block of training symbols is one of:
    a constant amplitude zero autocorrelation sequence, CAZAC, in the time domain with symmetric and conjugated response,
    a Zadoff-Chu sequence defined in the time domain or in the frequency domain with symmetric and conjugated response, and
    a real random sequence defined in the frequency domain.

10. The method of claim 6, wherein a cross-correlation of the samples of the first block of training symbols and of the samples of the reversed suffix or a cross correlation of the samples of the reversed first block of training symbols and the samples of the suffix exhibit a pulse like signal upon exact match.

11. A transmitter adapted and configured for transmitting digital data using a frequency divisional multiplexing, the transmitter configured to perform:
    mapping the digital payload data to a block of payload symbols, said payload symbols being spread across at least two frequency bands and wherein at least two symbols being conveyed in at least one frequency band;
    providing a first block of training symbols spread across the at least two frequency bands;
    appending a suffix to the block of payload symbols, wherein a cross-correlation of the first block of training symbols and a reversed suffix or a cross correlation of the reversed first block of training symbols and the suffix exhibit a pulse like signal upon exact match; and
    transmitting the first block of training symbols, the block of payload symbols and the suffix.

12. The transmitter of claim 11, wherein a plurality of blocks of payload symbols and a corresponding plurality of suffixes are transmitted contiguously, and wherein the suffix appended to a current block of payload symbols form the first block of training symbols of the following block of payload symbols.

13. The transmitter of claim 11, wherein the prefix and the first block of training symbols is one of
- a constant amplitude zero autocorrelation sequence, CAZAC, in the time domain with symmetric and conjugated response,
- a Zadoff-Chu sequence defined in the time domain or in the frequency domain with symmetric and conjugated response, and
- a real random sequence defined in the frequency domain.

14. A receiver comprising a synchronization stage for receiving digital data using a frequency divisional multiplexing, the receiver being adapted to perform the following:
- receiving a frequency divisional multiplexing signal representing the digital data;
- sampling the signal to produce samples of a first block of training symbols, samples of a block of payload symbols, and samples of a suffix appended to the block of payload symbols, wherein the samples of the first block of training symbols, the samples of the payload symbols, and the samples of the suffix are spread across at least two frequency bands and wherein at least two payload symbols are conveyed in at least one frequency band, wherein a cross-correlation of the first block of training symbols and the reversed suffix or a cross correlation of the reversed first block of training symbols and the suffix exhibit a pulse like signal upon exact match, and
- identifying the first block of training symbols and the suffix, comprising:
  - reversing the samples of either the first block of training symbols or the suffix and cross-correlating the samples of the reversed first block of training symbols and the suffix or the samples of the first block of training symbols and the samples of the reversed suffix respectively.

15. The receiver of claim 14 wherein the first block of training symbols is a prefix prepended to the block of payload symbols.

16. The receiver of claim 14 wherein the first block of training symbols is a suffix appended to a previous block of received payload symbols.

\* \* \* \* \*